United States Patent Office 2,766,288
Patented Oct. 9, 1956

2,766,288

BIS-TERTIARY AMINOALKOXY ALKANES

John G. Erickson, Minneapolis, Minn., assignor to General Mills, Inc., a corporation of Delaware No Drawing. Application November 12, 1952,
Serial No. 320,155

4 Claims. (Cl. 260—584)

The present invention relates to polyamines having the following formula:

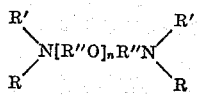

in which R is an aliphatic hydrocarbon group containing from 1–22 carbon atoms, R' is hydrogen or an aliphatic hydrocarbon group containing from 1–22 carbon atoms, R'' is selected from the group consisting of ethylene and propylene, and $n$ is an integer from 2–5. These compounds are useful as polyamines, and are particularly adapted for the production of bentonite complexes in conjunction with dialkyl fatty quaternary ammonium compounds. These complexes are useful in the production of high quality greases. The polyamines of the present invention are also useful for the preparation of novel polyquaternary ammonium compounds.

It is, therefore, an object of the present invention to provide novel compounds having the above formula.

It is another object of the present invention to provide a novel process of producing such compounds.

The compounds of the present invention may be prepared by the reaction of a polyglycol dichloride with an amine.

A wide variety of amines may be employed for the preparation of the polyamines. These include primary and secondary amines containing 1 or 2 aliphatic hydrocarbon substituents attached to the nitrogen. Typical amines include dimethylamine, diethylamine, dipropylamine, dibutylamine, dodecylamine, didodecylamine, tetradecylamine, octadecylamine, dioctadecylamine, methyldodecylamine, methyloctadecylamine, and the like. The reaction involves the combination of 2 mols of amine with 1 mol of the glycol dichloride. It is preferred, however, to use an excess of amine, as side reactions such as the formation of quaternary ammonium compounds can be decreased in this manner. It is usually desirable to use from 2½–3 mols of amine for each mol of the glycol dichloride.

The reaction is carried on by heating the amine and the glycol dichloride at temperatures of from 50–200° C. With the shorter chain amines the reaction proceeds readily at 60–70° C., while with the longer chain amines temperatures of 100–200° C., preferably 150–200° C., are employed. Above 200° C. the reaction mixture appears to undergo some decomposition.

The reaction may be carried out in the presence of solvents, such as lower aliphatic alcohols, aromatic and aliphatic hydrocarbons, and halogenated aromatic hydrocarbons. The use of a solvent, however, is not essential to the reaction. The time of reaction varies with the temperature and with the particular reactants. Usually, however, time periods of from 10–30 hours are suitable.

Following the reaction, the product may be worked up by washing the reaction mixture with an aqueous solution of sodium hydroxide to neutralize the HCl, and by then washing the reaction mixture with water. Any excess amine may then be distilled off. In some instances it may be desirable to distill the products. In others, they may be purified by crystallization.

The products of the invention have a variety of properties, depending upon the particular composition of the product. Generally those having lower aliphatic hydrocarbon substituents on the nitrogen tend to be water-soluble, while those containing a number of butyl groups, or longer chain groups, are water-insoluble. For example, the tetramethyl and tetraethyl substituted products are water-soluble. The tetrabutyl substituted product is insoluble in water. Between these extremes, variations in solubility will be encountered, depending upon the number of substituent groups. The water-soluble compounds are useful in treating soil for agricultural purposes. These compounds tend to react with the clay soil to bind the soil together to make it more porous and less colloidal in character. These amines may also be used to react, either as free amines or as amine salts, with bentonite to form complexes which in combination with dimethyl difatty quaternary ammonium compounds are capable of being used in the manufacture of excellent greases. These polyamines are also useful for the preparation of quaternary ammonium compounds.

The water-insoluble polyamino compounds may be used for a variety of preventive uses. For example, in the treatment of soil they are found to have a water-proofing effect which is useful in the stabilization of soil for road building and other purposes. They likewise react, as free amines or amine salts, with bentonite to form complexes which in combination with the quaternary ammonium compounds may be used for the formation of greases. In this connection, it is desired to point out that the tertiary polyamines are preferred for this purpose, and in addition it is preferred to employ compounds containing as many long-chain fatty groups as possible. This is found to have a phenomenal effect upon the character of the grease. For example, on an empirical scale a grease prepared from the diacetate of 1,2-bis-(2-diethylamino)-ethane was found to give a grease a stiffness of 550., while a grease derived from the diacetate of 1,2-bis(2-dioctadecylaminoethoxy)ethane was found to have a stiffness greater than 2025. In contrast, a bentonite complex grease made without these polyamines had a stiffness on the same scale of 125.

*Example 1*

Thirty-seven parts of dodecylamine and 9.4 parts of triglycol dichloride were heated at 180° C. for 22 hours. The mixture was then poured into butyl alcohol and washed with excess sodium hydroxide and with water. The butyl alcohol and excess amine were then distilled off. The product, 1,2 - bis(2 - dodecylaminoethoxy)-ethane, distilled at 170–200° C. at 0.03–0.05 mm. pressure. It is a solid, M. P. 39–40° C. Titration gave a neutral equivalent of 249; the theoretical neutral equivalent is 242.

*Example 2*

A mixture of 28.2 parts of didodecylamine and 3.7 parts of triglycol dichloride was heated at 175–180° C. for 26 hours. The mixture was then dissolved in benzene and washed with excess dilute sodium hydroxide. The benzene and excess secondary amine were distilled off, leaving a liquid residue of 1,2-bis(2-didodecylaminoethoxy)-ethane. Its neutral equivalent was 405; the theoretical value is 410.

*Example 3*

A mixture of 208.4 parts of dioctadecylamine and 18.7 parts of triglycol dichloride was heated at 180° for 31.5 hours. It was then dissolved in butyl alcohol and washed with excess dilute sodium hydroxide and water. The alcohol and excess secondary amine were distilled off. The residue was recrystallized from butylalcohol, yielding 1,2-bis(2-dioctadecylaminoethoxy)ethane, M. P. 44–45°, neutral equivalent 584. The theoretical neutral equivalent is 578.

A solution of 0.23 part of 1,2-bis-(2-dioctadecylaminoethoxy)ethane in isopropyl alcohol was added to 1000 parts of 1% aqueous bentonite dispersion. A solution of 5.5 parts of diocetadecyldimethylammonium chloride in isopropyl alcohol was then added. The mixture was filtered and the precipitate was dried and crushed. When milled into heavy mineral oil at 10% solids concentration, it gave a grease, stiffness 1650. When this was diluted to 5% solids by milling in added oil, the stiffness was 350. This 5% grease did not separate oil.

*Example 4*

A mixture of 87.7 parts of diethylamine, 74.8 parts of triglycol dichloride, and 160 parts of n-butyl alcohol was refluxed for 19 hours. It was then neutralized with sodium hydroxide, washed with water, and distilled, giving 1,2-bis(2-diethylaminoethoxy)ethane, a liquid boiling at 85–100° C. at 0.05–0.10 mm. pressure.

*Example 5*

A mixture of 46.8 parts of triglycol dichloride and 100 parts of dibutylamine was refluxed for 1 hour. Since a solid was forming in the mixture, 50 parts of ethylene glycol was added and the mixture was refluxed (185° C.) for another hour. The mixture was poured into water, washed with sodium hydroxide solution and water, and distilled, giving 1,2-bis(2-dibutylaminoethoxy)ethane, a liquid boiling at 122–139° C. at 0.02 mm. pressure.

I claim as my invention:
1. Compounds having the following formula:

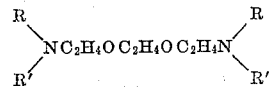

in which R and R' are saturated aliphatic hydrocarbon groups containing from 8–22 carbon atoms.

2. 1,2-bis(2-didodecylaminoethoxy)ethane.
3. 1,2-bis(2-dioctadecylaminoethoxy)ethane.
4. Process of producing compounds having the following formula:

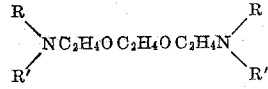

in which R and R' are saturated aliphatic hydrocarbon groups containing from 8–22 carbon atoms which comprises reacting a secondary fatty amine with triglycol dichloride at a temperature within the approximate range of 100–200° C.

References Cited in the file of this patent
UNITED STATES PATENTS

| | | |
|---|---|---|
| 2,194,906 | Krzikalla et al. | Mar. 26, 1940 |
| 2,216,958 | Pannwitz | Oct. 8, 1940 |
| 2,261,002 | Ritter | Oct. 28, 1941 |
| 2,334,782 | Martin | Nov. 23, 1943 |
| 2,560,280 | De Benneville | July 10, 1951 |
| 2,683,147 | Girod | July 6, 1954 |

FOREIGN PATENTS

| | | |
|---|---|---|
| 558,423 | Great Britain | Jan. 5, 1944 |